US012709787B2

(12) United States Patent
Nawaoka et al.

(10) Patent No.: US 12,709,787 B2
(45) Date of Patent: Aug. 18, 2026

(54) STRAIN RESISTANCE FILM, PHYSICAL QUANTITY SENSOR, AND METHOD FOR MANUFACTURING THE STRAIN RESISTANCE FILM

(71) Applicant: TDK CORPORATION, Tokyo (JP)

(72) Inventors: Kohei Nawaoka, Tokyo (JP); Ken Unno, Tokyo (JP); Tetsuya Sasahara, Tokyo (JP); Masanori Kobayashi, Tokyo (JP); Tetsuo Hata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 267 days.

(21) Appl. No.: 18/479,526

(22) Filed: Oct. 2, 2023

(65) Prior Publication Data

US 2024/0117474 A1 Apr. 11, 2024

(30) Foreign Application Priority Data

Oct. 5, 2022 (JP) ................................ 2022-161188

(51) Int. Cl.
*G01B 7/16* (2006.01)
*C22C 27/06* (2006.01)

(52) U.S. Cl.
CPC ................ *C22C 27/06* (2013.01); *G01B 7/18* (2013.01)

(58) Field of Classification Search
CPC ............ G01B 7/18; G01L 1/18; G01L 1/2287
See application file for complete search history.

(56) References Cited

U.S. PATENT DOCUMENTS

| | | | | |
|---|---|---|---|---|
| 5,001,454 A * | 3/1991 | Yamadera | G01L 1/2287 338/308 |
| 9,249,515 B2 * | 2/2016 | Schier | C23C 28/044 |
| 9,534,961 B2 * | 1/2017 | Fujita | C23C 14/0641 |
| 9,831,019 B2 * | 11/2017 | Fujita | C23C 14/0042 |
| 9,863,035 B2 * | 1/2018 | Fujita | H01C 7/042 |
| 9,869,015 B2 * | 1/2018 | Sobiech | C23C 28/44 |
| 12,173,410 B2 * | 12/2024 | Bolvardi | C23C 28/42 |
| 12,411,000 B2 * | 9/2025 | Kitamura | G01B 7/20 |
| 12,523,461 B2 * | 1/2026 | Kitamura | G01B 7/18 |
| 12,523,556 B2 * | 1/2026 | Toda | G01L 1/2287 |
| 2004/0137281 A1 * | 7/2004 | Ishikawa | C23C 14/0676 427/580 |
| 2025/0110000 A1 * | 4/2025 | Kobayashi | G01L 9/0051 |
| 2026/0029284 A1 * | 1/2026 | Toda | G01B 7/20 |
| 2026/0036474 A1 * | 2/2026 | Toda | G01B 7/20 |

FOREIGN PATENT DOCUMENTS

| | | |
|---|---|---|
| JP | 2015-031633 A | 2/2015 |
| JP | 2018-091848 A | 6/2018 |
| JP | 2019-192740 A | 10/2019 |
| JP | 2019204874 A * | 11/2019 |
| WO | 2022/209963 A1 | 10/2022 |

OTHER PUBLICATIONS

Oxidation behavior of Cr—Al—N—O thin films prepared by pulsed laser deposition_Hirai et al.(Year: 2002).*
English translation of JP 2019204874 (Year: 2019).*
Ozawa et al., "Electrical Properties of Cr—Al Alloy Thin Films," IEEE Transactions on Components, Hybrids, and Manufacturing Technology, Dec. 1986, vol. CHMT-9, No. 4, pp. 391-395.

* cited by examiner

*Primary Examiner* — Tran M. Tran
(74) *Attorney, Agent, or Firm* — Oliff PLC

(57) ABSTRACT

A strain resistance film containing a composition represented by $Cr_{100-x-y-z}Al_xN_yO_z$, satisfying $5 \le x \le 50$, $0.1 \le y \le 20$, $0.1 \le z \le 17$, and $y+z \le 25$.

7 Claims, 6 Drawing Sheets

STRAIN RESISTANCE FILM, PHYSICAL QUANTITY SENSOR, AND METHOD FOR MANUFACTURING THE STRAIN RESISTANCE FILM

CROSS-REFERENCE TO RELATED APPLICATIONS

The present application claims priority from Japanese Patent Application No. 2022-161188 filed on Oct. 5, 2022, the entire contents of which are hereby incorporated by reference.

BACKGROUND

The disclosure relates to a strain resistance flint in which resistance value changes according to strain, and a physical quantity sensor using thereof.

CrAl film or CrAlN film is a material that exhibits a high k-factor up to high temperatures, and is noted as a detection material for pressure sensors and strain sensors that can with stand high temperatures. Patent Document 1 describes an example thereof.

According to this type of CrAl film or CrAlN film, the conductive properties change from metal to semiconductor at a certain Al content ratio. It becomes possible to control the temperature coefficient of resistance (TCR) by controlling this conduction property.

TCR, which is one of the above conductive properties, has been controlled by the annealing, temperature at the same Cr—Al ratio. Also, k-factor is controlled by Changing, Cr—Al composition ratio and the annealing temperature. Therefore, when adjusting TCR for each product, it was necessary to adjust Cr—Al composition ratio of the material for each product.

Patent Document 1: Japanese unexamined patent publication 2018-91848

SUMMARY

It is desirable to provide a strain resistance film that maintains a relatively high k-factor and is easy to control TCR, and a physical quantity sensor having the strain resistance film.

As a result of intensive studies on strain resistance films containing Cr, Al and N, the inventors have found that a relatively high k-factor can be maintained and TCR can be easily controlled by further containing “0” and particularly controlling the composition ratio of “N” and “0”.

That is, the strain resistance film has a composition represented by $Cr_{100-x-y-z}Al_xN_yO_z$ which satisfies $5 \le x \le 50$, $0.1 \le y \le 20$, $0.1 \le z \le 17$, and $y+z \le 25$.

The physical quantity sensor has the strain resistance film described above. The physical quantity sensor is not particularly limited, and examples thereof include such as strain sensors and pressure sensors.

A manufacturing method for a strain resistance film is a method for manufacturing a strain resistance film, in which k-factor and TCR of the strain resistance film are controlled by controlling amounts of oxygen and nitrogen in an atmosphere gas, which is used to manufacture the strain resistance film by a thin film method.

DETAILED DESCRIPTION

Hereinafter, the disclosure will be described in detail based on embodiments.

Figure 1:
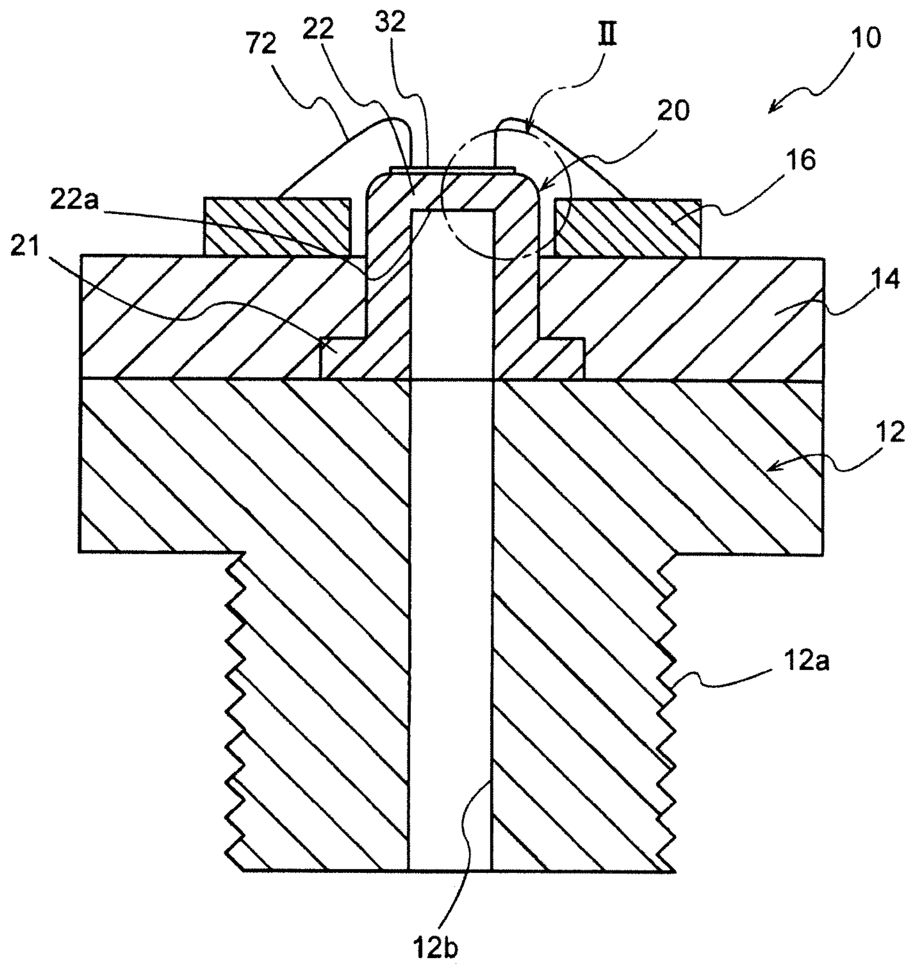
FIG. 1 is a schematic cross-sectional view of a pressure sensor according to an embodiment.

FIG. 1 is a schematic cross-sectional view of pressure sensor 10 using a strain resistance film 32 according to an embodiment. As shown in FIG. 1, the pressure sensor 10 has a membrane 22 that deforms in response to pressure. According to FIG. 1, the membrane 22 is configured with an end wall formed at one end of a hollow cylindrical stem 20, however, it can also be configured with a flat Si substrate 122 (See FIG. 3B) as in Example. The other end of the stem 20 is an open end of a hollow, and the hollow of the stem 20 communicates with the flow path 12*b* of the connecting member 12.

In the pressure sensor 10, the fluid introduced into the flow path 12*b* is guided from the hollow of the stem 20 to the inner surface 22*a* of the membrane 22 to apply fluid pressure to the membrane 22. Stem 20 is composed of metal such as stainless steel. However, the shape corresponding to the stem 20 may be formed by etching a silicon substrate or bonding the flat silicon substrate to another member.

A flange 21 is formed around the open end of the stem 20 so as to protrude outward from the axis of the stem 20. The flange 21 is between the connecting member 12 and the suppressing member 14 so that the channel 12*b* leading to the inner surface 22*a* of the membrane 22 is sealed.

The connecting member 12 has a thread groove 12*a* for fixing the pressure sensor 10. The pressure sensor 10 is fixed via the thread groove 12*a* to a pressure chamber or the like in which a fluid to be measured is enclosed. As a result, the channel 12*b* formed inside the connecting member 12 and the inner surface 22*a* of the membrane 22 of the stem 20 are airtightly communicated with the pressure chamber in which the fluid to be measured exists.

A circuit board 16 is attached to the upper surface of the suppressing member 14. The circuit board 16 has a ring shape surrounding the stem 20, but the shape of the circuit board 16 is not limited thereto. The circuit board 16 incorporates, for example, a circuit to which the detection signal from the strain resistance film 32 is transmitted.

As shown in FIG. 1, a strain resistance film 32 and the like are provided on the outer surface of the membrane 22. The strain resistance film 32 and the circuit board 16 are electrically connected via an intermediate wiring 72 or the like by wire bonding or the like.

Figure 2:
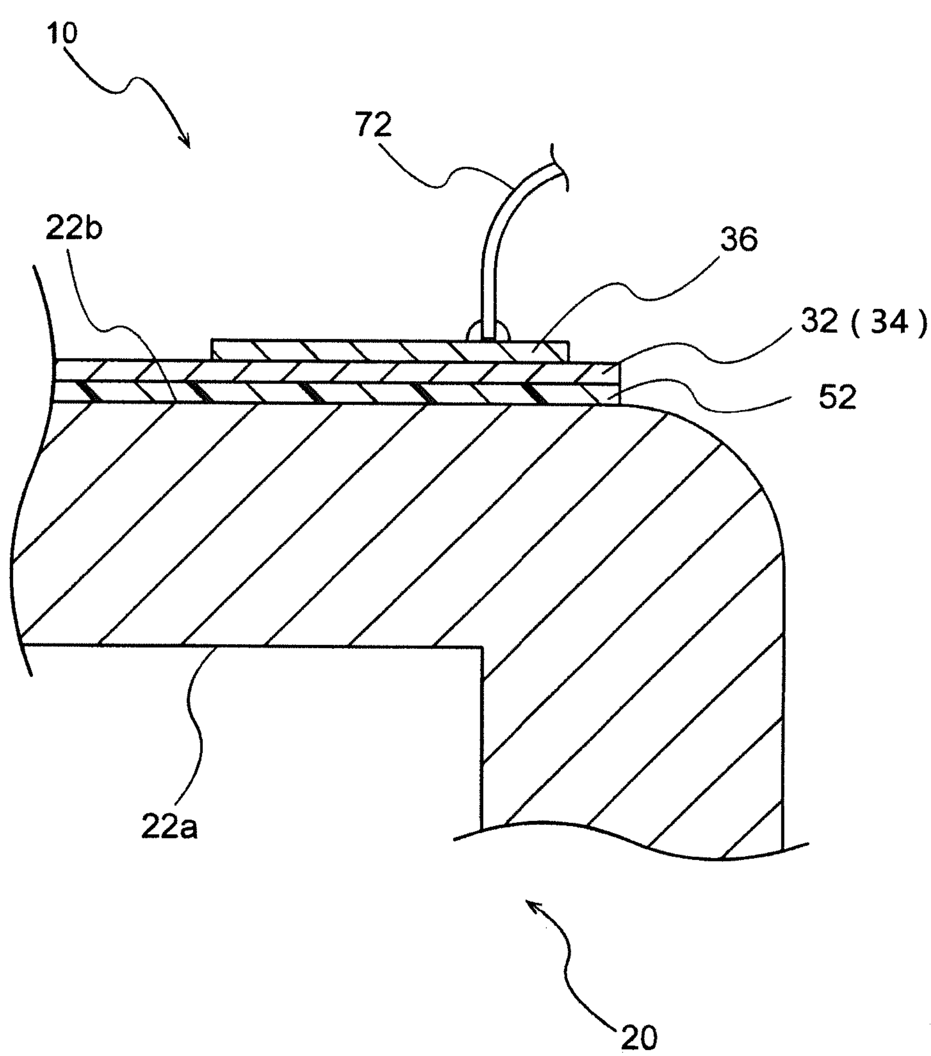
FIG. 2 is an enlarged cross-sectional view of a part indicated by II in FIG. 1.

FIG. 2 is a schematic cross-sectional view showing an enlarged view of a part of the strain resistance film 32 included in the pressure sensor 10 shown in FIG. 1 and its surroundings.

As shown in FIG. 2, the strain resistance film 32 is provided on the outer surface 22*b* of the membrane 22 via the base insulating layer 52 or the like. The base insulating layer 52 is formed to cover substantially the entire outer surface 22*b* of the membrane 22, and is made of silicon oxide such as $SiO_2$, silicon nitride, or silicon oxynitride and the like. The thickness of the base insulating layer 52 is preferably 10 μm or less, more preferably 1 to 5 μm. The base insulating layer 52 can be formed on the outer surface 22*b* of the membrane 22 by a vapor deposition of CVD and the like.

If the outer surface 22*b* of the membrane 22 has insulating properties, the strain resistance film 32 may be formed directly on the outer surface 22*b* of the membrane 22 without forming the base insulating layer 52. For example, when the membrane 22 is made of an insulating material such as alumina, the strain resistance film 32 may be provided directly on the membrane 22.

Figure 3A:
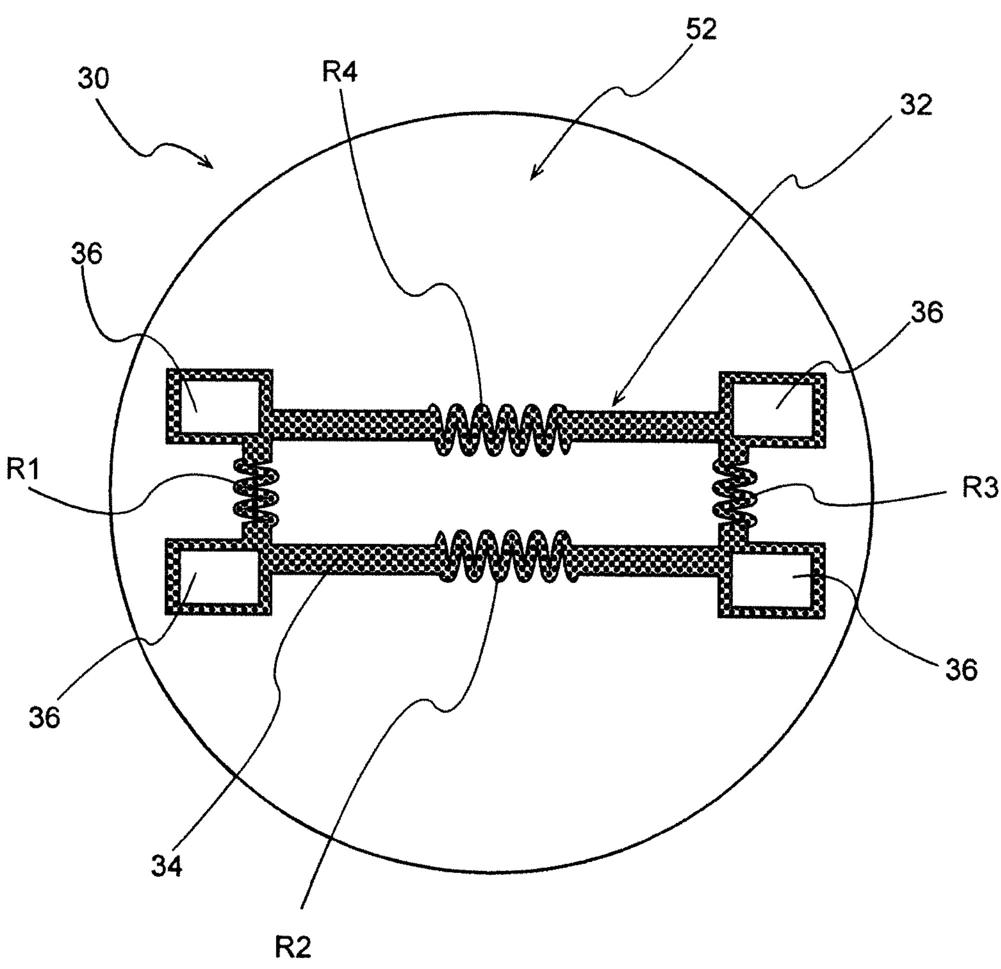
FIG. 3A is a schematic diagram showing an example of a pattern arrangement of the strain resistance film with electrodes included in the pressure sensor shown in FIG. 1.

As shown in FIG. 2, an electrode 36 is provided on the strain resistance film 32. FIG. 3A is a schematic plan view of the strain resistance film 30 with electrodes shown in FIGS. 1 and 2 as viewed from above, and shows the pattern arrangement of the strain resistance film 30 with electrodes.

As shown in FIG. 3A, the strain resistance film 32 has a first resistor R1, a second resistor R2, a third resistor R3 and a fourth resistor R4 formed in a predetermined pattern. The first to fourth resistors R1, R2, R3, and R4 generate strain according to the deformation of the membrane 22, and the resistance value changes according to the deformation of the membrane 22. These first to fourth resistors R1 to R4 are connected by electrical wiring 34 so as to form a Wheatstone bridge circuit.

The pressure sensor 10 shown in FIG. 1 detects the fluid pressure acting on the membrane 22 from the output of the Wheatstone bridge circuit by the first to fourth resistors R1 to R4 shown in FIG. 3A. That is, the first to fourth resistors R1 to R4 are provided at positions where the membrane 22 shown in FIGS. 1 and 2 is deformed and strained by the fluid pressure, and the resistance value changes according to the amount of strain.

The strain resistance film 32 having the first to fourth resistors R1 to R4 can be manufactured by such as patterning a conductive thin film of a predetermined material. In this embodiment, the strain resistance film 32 has a composition represented by the composition $Cr_{100-x-y-z}Al_xN_yO_z$ where $5 \leq x \leq 50$, $0.1 \leq y \leq 20$, $0.1 \leq z \leq 17$ which satisfies $y+z \leq 25$.

The lower limit of "x" may be preferably 12.7 or more, 23 or more, or 25 or more. The upper limit of "x" may be 40 or less, or 30 or less. "y" is preferably 1.1 to 12.2. "z" may be preferably 0.4 to 1.3, more preferably 0.4 to 0.7 or 2.6 to 9.5. "y+z" may be preferably 12.0 to 19.6, more preferably 14.0 to 19.6, or 1.8 to 10.7.

Although the thickness of the strain resistance film 32 is not particularly limited, it is preferably one nm or more, more preferably 10 nm or more. Although upper limit of the thickness is not particularly limited, it may be 1000 nm or less or 500 nm or less.

An oxide film or the like may be formed on the surface of the strain resistance film 32. Examples of the oxide film include a chromium oxide film, a silicon oxide film, a silicon nitride film, a silicon oxynitride film, an aluminum oxide film, an aluminum nitride film, an aluminum oxynitride film, and the like.

The composition analysis of "x", "y", "z", etc. in the strain resistance film 32 may be performed using XRF (X-ray fluorescence) method, XPS (X-ray photoelectron spectroscopy), etc. In the embodiment, it is preferable that the result of composition analysis at an intermediate position along the depth direction in the strain resistance film 32 except for its surface oxide film is within the above range.

The strain resistance film 32 may contain trace amounts of metals and nonmetallic elements other than Cr and Al. Examples of metal and non-metal elements other than Cr and Al contained in the strain resistance film 32 include Ti, Nb, Ta, Ni, Zr, Hf, Si, Ge, C, P, Se, Te, Zn, Cu, Bi, Fe, Mo, W, As, Sn, Sb, Pb, B, Ge, In, Tl, Ru, Rh, Re, Os, Ir, Pt, Pd, Ag, Au, Co, Be, Mg, Ca, Sr, Ba, Mn and rare earth elements are included.

The strain resistance film 32 can be formed by a thin film method such as sputtering or vapor deposition. The first to fourth resistors R1 to R4 shown in FIG. 3A can be formed by such as patterning a thin film into a meandering shape. Note that the electrical wiring 34, as shown in FIG. 3A, may be formed by patterning the strain resistance film 32 or by a conductive film or layer different from the strain resistance film 32.

"O" and "N" contained in the strain resistance film 32 are preferably intentionally introduced into the strain resistance film 32 by being used as an atmosphere gas during film formation of the strain resistance film, however, may be intentionally introduced into the strain resistance film 32 by used as atmosphere gases for annealing. Alternatively, it may be a substance that was not completely removed from the reaction chamber when the strain resistance film 32 was formed, and was taken into the strain resistance film 32.

In any case, when the strain resistance film 32 of the embodiment is manufactured by a thin film method, k-factor and TCR (Temperature Coefficient of Resistance) can be controlled by controlling the amounts of oxygen and nitrogen in the atmosphere gas for manufacturing the film. Also, TCS (Temperature Coefficient of Sensitivity) of the strain resistance film 32 can also be controlled by controlling the amounts of oxygen and nitrogen in the atmosphere gas for manufacturing the film.

For example, when the strain resistance film 32 is manufactured using a sputtering method, the conditions in the sputtering apparatus are preferably 0.08 to 0.2 Pa, and the atmosphere gas for manufacturing contains an inert gas, nitrogen gas and oxygen gas. Further, when the total pressure of the atmosphere gas is 100%, the partial pressure of nitrogen gas is preferably 0 to 20%, the partial pressure of oxygen gas is preferably 0 to 15%, and the rest is the partial pressure of inert gas. Ar gas, Ne gas, or the like can be used as the inert gas.

After manufacturing the strain resistance film 32 by the thin film method, the strain resistance film 32 may be heat treated. Although the heat treatment temperature is not particularly limited, it may be such as 50° C. to 550° C., preferably 350° C. to 550° C.

As shown in FIGS. 2 and 3A, the electrode 36 is provided on top of the electrical wiring 34 made of the same material as the strain resistance film 32, and electrically connected to the strain resistance film 32. As shown in FIG. 2, the electrode 36 is formed on a part of the upper surface of the electrical wiring 34 made of the strain resistance film 32. The output of the Wheatstone bridge circuit of strain resistance film 32 is transmitted to circuit board 16 shown in FIG. 1 via the electrode 36 and an intermediate wiring 72. The materials of the electrode 36 include conductive metals, alloys, and the like, and more specifically, Cr, Ti, Ni, Mo, platinum group elements, Au, and the like. Further, the electrode 36 may have a multi-layer structure made of different materials.

The base insulating layer 52 and the electrode 36 shown in FIG. 2 can also be formed by a thin film method such as sputtering or vapor deposition, similarly to the strain resistance film 32, however, the base insulating layer 52 and the electrode 36 may be formed by a method other than the thin film method. For example, the base insulating layer 52 of $SiO_2$ film may be provided on the surface of the Si substrate by heating the Si substrate surface and forming a thermal oxide film.

According to the strain resistance film 32 of the embodiment, the TCR can be easily controlled while maintaining a high k-factor of four or more. The k-factor corresponds to the gauge factor of the pressure sensor. For example, according to the strain resistance film satisfying the above composition ratio, it becomes possible to make an absolute value of the temperature coefficient of resistance (TCR) to 2000 ppm/° C. or less, more preferably 1000 ppm/° C. or less, while maintaining k-factor high to four or more. By setting the absolute value of the temperature resistance coefficient (TCR) to a predetermined value or less, it becomes possible to suppress errors in strain detection, pressure detection, etc. due to the influence of temperature.

In addition, the strain resistance film that satisfies the above composition ratio is possible to maintain a high k-factor of four or more, while making an absolute value of the temperature coefficient of sensitivity (TCS) to preferably 2000 ppm/° C. or less, more preferably 1000 ppm/° C. or less in the temperature range of −50° C. or more to 450° C. or less. By setting the absolute value of the temperature coefficient of sensitivity (TCS) to a predetermined value or less, it becomes possible to suppress errors in strain detection, pressure detection, etc. due to the influence of temperature.

Such strain resistance film 32 has a small resistance value change (and/or sensitivity change) accompanying temperature change over a wide range from low temperature to high temperature. Thus, the strain resistance film 32 is preferably used as the strain resistance film 32 of the pressure sensor 10 used in a wide temperature range, and can reduce temperature correction error and perform highly accurate detection.

In order to manufacture the strain resistance film 32 of the embodiment, a target having a fixed ratio of Cr and Al is used, and by such as controlling the amounts of nitrogen and oxygen in the atmosphere gas used for manufacturing the film, the nitrogen and/or oxygen contents in the obtained resistance film can be controlled and the k-factor and TCR of the strain resistance film can be controlled.

That is, without preparing targets with different ratios of Cr and Al, using a target with a fixed ratio of Cr and Al, it becomes easy to manufacture multiple types of strain resistance films with controlled k-factor and TCR. As a result, the production speed as well as the production efficiency of the strain resistance film are improved.

Furthermore, according to the strain resistance film 32 satisfying the above composition ratio, it is easy to control the resistivity (ρ) of the strain resistance film 32 to 1 to 15 Ω·μm. By setting the resistivity to a specific range, for instance, a circuit for sensor such as a Wheatstone bridge circuit can be easily manufactured using the strained resistance film 32.

In this embodiment, the strain resistance film 32 has a film thickness of 10 nm or more. By using the strain resistance film 32 having a predetermined film thickness or more, the k-factor and TCR of the strain resistance film 32 can be easily controlled.

Further, according to the manufacturing method of the strain resistance film 32 of the embodiment, for example, by using a target having a fixed ratio of Cr and Al and controlling the amount of nitrogen and/or oxygen in the atmosphere gas for manufacturing the film, the nitrogen and the oxygen contents in the obtained strain resistance film can be controlled and the k-factor and TCR (and/or TCS) of the strain resistance film can also be controlled.

That is, without preparing targets with different ratios of Cr and Al, it becomes easy to manufacture multiple types of strain resistance films with controlled k-factor and TCR (and/or TCS) by using targets with a fixed ratio of Cr and Al. As a result, the production speed as well as the production efficiency of the strain resistance film are improved.

The disclosure is not limited to the above-described embodiments, and can be modified in various ways within the scope of the disclosure.

For example, the pressure sensor 10 is not limited to the sensor having the stem 20 shown in FIG. 1. The pressure sensor 10 may be a pressure sensor manufactured by etching the substrate, or may be a sensor manufactured by bonding a flat substrate, on which a strain resistance film is formed, to the other member. The materials of the substrate may be any of metal, semiconductor, and insulator, and specifically, alumina ($Al_2O_3$) and the like can be used in addition to Si mentioned in the examples.

In addition, the strain resistance film of the embodiment can be used as a physical quantity sensor other than the pressure sensor 10. Other physical quantity sensors include such as strain sensors, angle sensors, movement amount sensors, and acceleration sensors.

EXAMPLE

The disclosure will be described below based on more detailed examples, but the disclosure is not limited thereto.

Example 1

Figure 3B:
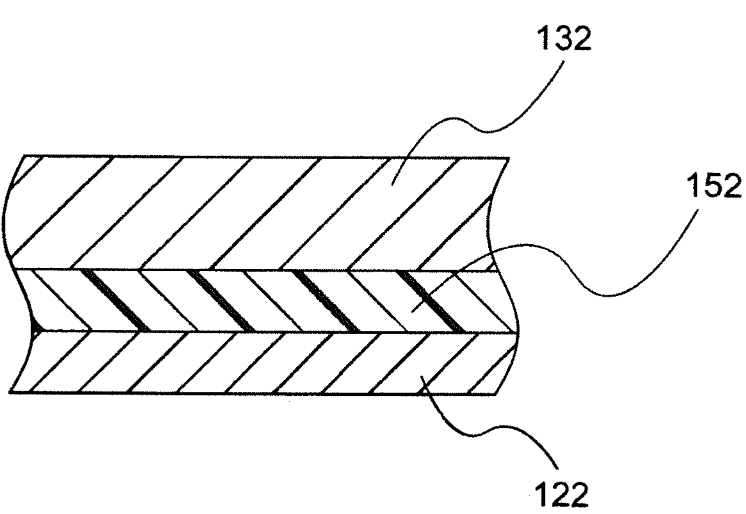
FIG. 3B is a conceptual diagram illustrating the strain resistance film according to the example.

First, as shown in FIG. 3B, the Si substrate 122 was prepared and its surface was heated to form the $SiO_2$ film 152 as a thermal oxide film on the surface of the Si substrate 122. After that, the strain resistance film 132 was formed on the surface of the $SiO_2$ film 152 using a DC sputtering apparatus. The atmosphere gas in the sputtering apparatus for manufacturing the film was Ar gas containing trace amounts of nitrogen and oxygen, and the pressure of the atmosphere gas was within the range of 0.08 to 0.2 Pa. When the total pressure of the atmosphere gas was 100%, partial pressure of nitrogen gas was 0 to 20%, partial pressure of oxygen gas was 0 to 15%, and the rest was the partial pressure of inert gas.

Strain resistance film samples 1 to 10 with different N contents (y value) and O contents (z values) were manufactured by changing the oxygen partial pressure and/or nitrogen partial pressure in the atmosphere gas during film formation, while fixing the ratio of the Cr target and the Al target used in the sputtering apparatus. The result confirmed that the higher the oxygen partial pressure in the atmosphere gas, the greater the 0 content (z value) in the central position along the thickness direction of the finally obtained strain resistance film.

Furthermore, the strained resistance film 132 after the film formation at 350° C. was annealed, then, resistors constituting a Wheatstone bridge circuit were formed in the strained resistance film 132 by microfabrication. Finally, an electrode layer was formed on the surface of the strain resistance film 132 by electron deposition to obtain samples. The average film thickness of the strain resistance film 132 in each sample was within the range of 300 nm±30 nm. The film thickness of the strain resistance film 132 was measured using a stylus profiler.

The following analysis and measurements were performed for each sample 1 to 10.

[Composition Analysis]

The composition of the strain resistance film 132 for each sample was analyzed by the XRF (X-ray fluorescence) method. Table 1 shows the results.

[Resistivity (Specific Resistance)]

For each sample, the resistance value was measured by the four-terminal measurement method at 25° C. The specific resistance was calculated from the measured value of the sample, and the area and the thickness of the strain resistance film samples. Results are shown in Table 1.

[Measurement of Temperature Coefficient of Resistance (TCR)]

For each sample, the resistance value was measured while changing the environmental temperature from −50° C. to 450° C., and the relationship between the resistance value and temperature was linearly approximated by the least squares method to obtain a slope. TCR (ppm/° C.) for each sample was calculated from the slope. Reference temperature of the calculated TCR was 25° C. Results are shown in Table 1.

[Measurement of k-Factor and Temperature Coefficient of Resistance (TCS)]

For each sample, the gauge factor was measured while changing the environmental temperature from −50° C. to 450° C., and the relationship between the gauge factor and the temperature was linearly approximated by the least squares method to obtain a slope. TCS (ppm/° C.) for each sample was calculated from the slope. Reference temperature of the calculated TCS was 25° C., and the measured value was determined as k-factor. Results are shown in Table 1.

Example 2

Samples 11 to 15 were prepared in the same manner as in Example 1, except for reducing the number of Al targets used in the sputtering apparatus relative to Example 1, fixing the ratio of the Cr target and the Al target, and adjusting the partial pressure of the nitrogen gas in the sputtering apparatus to reduce the nitrogen content. Then, analysis was performed to the samples in the same manner as in Example 1. Results are shown in Table 2.

Example 3

Samples 21 to 23 were prepared in the same manner as in Example 1, except the atomic % of N+O in the finally obtained strain resistance film was about the same as that of sample number 7 in Example 1, which was around 14.0 atomic %, and the partial pressures of the nitrogen gas and the oxygen gas in the sputtering apparatus were adjusted so as to change the ratio of N atomic % and O atomic %. Then, analysis was performed to the samples in the same manner as in Example 1. Results are shown in Table 3.

Example 4

The composition of the finally obtained strain resistance film was the same as that of sample number 5 in Example 1, and the sputtering time of the sputtering device was controlled so that the film thickness varies to obtain strain resistance films of different thicknesses.

Evaluation

Figure 4:
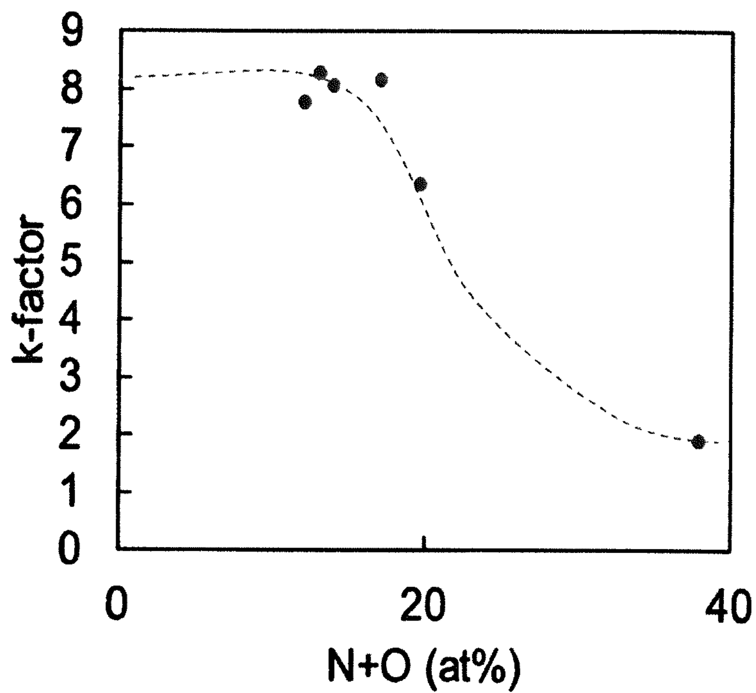
FIG. 4 is a graph showing the relationship between the N+O content and the k-factor.
Figure 5A:
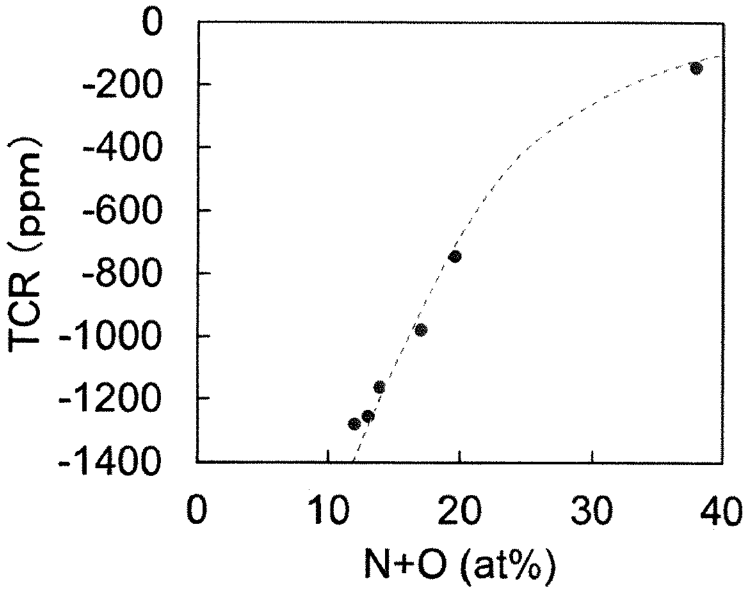
FIG. 5A is a graph showing the relationship between contents of “N+O” and TCR.
Figure 5B:
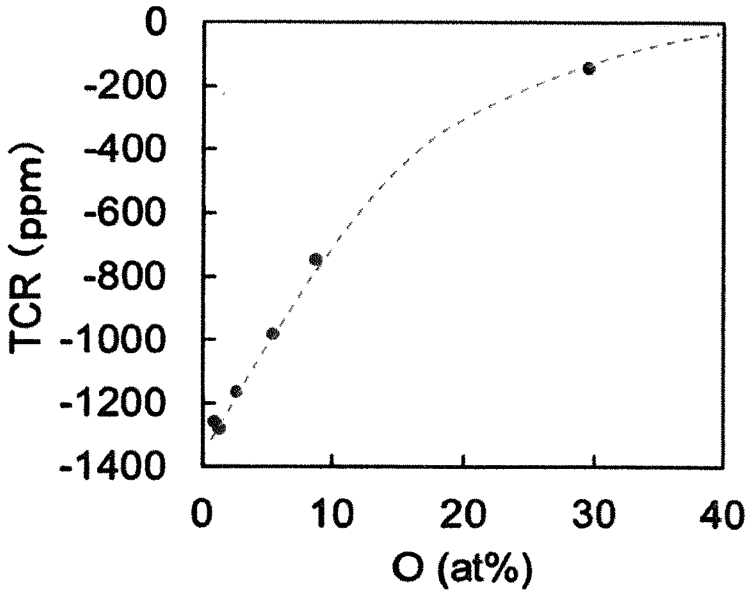
FIG. 5B is a graph showing the relationship between “O” content and TCR.

Results from Table 1, FIG. 4, FIG. 5A, and FIG. 5B confirm that the resistivity, k-factor, TCR, and TCS can be controlled simply by changing the content ratios of “N” and “O” while using targets with a fixed ratios of “Cr” and “Al”, and without a need for preparing targets with different ratios of Cr and Al. Each of FIGS. 4, 5A, and 5B was a graph obtained by sampling the data shown in Table 1.

According to Example 1, results from Table 1 and FIG. 4 confirm that the k-factor can be changed in the range of 2 to 8 by changing the content ratio (y+z) of N+O in the strain resistance film. In addition, results from Table 1 and FIG. 4 also confirm that the content ratio (y+z) of N+O in the strain resistance film is preferably 25 atomic % or less in order to make k-factor four or more, and the content ratio (y+z) of N+O in the strain resistance film is preferably 20 atomic % or less in order to make k-factor six or more.

Results from Table 1 and FIG. 5A confirm that the absolute value of TCR (and TCS) is preferably 2000 or less, more preferably 1000 or less by changing the content ratio (y+z) of N+O in the strain resistance film. In addition, results from Table 1 and FIG. 5B confirm that the absolute value of TCR (and TCS) is preferably 2000 or less, more preferably 1000 or less by changing the content ratio (z) of “O” in the strain resistance film.

Also, results from Tables 1 and 3 confirm that “x” is preferably 23 to 30, “z” is preferably 0.9 to 9.5, more preferably 2.6 to 9.5, and “y+z” is preferably 12.0 to 20.0, more preferably 14.0 to 20.0, in order to make the absolute value of TCR (and TCS) to 2000 or less, more preferably 1200 or less, and further preferably 1000 or less, while maintaining the resistivity of four Ω·μm or more and the k-factor of four or more, preferably six or more, more preferably eight or more.

Further, results from Table 2 confirm that “x” is preferably 12 to 14, “z” is preferably 0.4 to 0.7, and “y+z” is preferably 1.8 to 10.7, in order to maintain the resistivity to three Ω·μm or more, the k-factor to eight or more, and the absolute value of TCR (and TCS) to 2000 or less, preferably 1200 or less, and more preferably 1000 or less.

Also, results from Tables 1 to 3 confirm that the content ratio (y) of “N” in the strain resistance film is 0.1 to 20, preferably 1.1 to 12.2.

Furthermore, the results shown in Table 3 confirm that, by adjusting the content ratio of “O” compared to “N”, the resistivity, k-factor, TCR, and TCS can be improved, when “x” and “y+z” are substantially constant.

It was confirmed that preferable results can be obtained when the thickness of the strain resistance film was preferably 10 nm or more, more preferably 30 nm or more.

TABLE 1

| Sample No. | Cr | x Al | y N | z O | y + z N + O | Resistivity ρ (Ω · μm) | TCR ppm | k-factor | TCS ppm |
|---|---|---|---|---|---|---|---|---|---|
| | Strain Resistance Film Composition (at %) | | | | | | | | |
| 1 | 42.4 | 19.6 | 8.4 | 29.6 | 38.0 | 13 | −143 | 2 | 1379 |
| 2 | 51.6 | 23.4 | 8 | 17 | 25 | 9 | −380 | 4 | 305 |
| 3 | 56.5 | 25.5 | 8 | 10 | 18.0 | 6 | −635 | 5 | 645 |
| 4 | 55.4 | 24.6 | 10.5 | 9.5 | 20.0 | 6 | −718 | 6 | 303 |
| 5 | 55.7 | 24.7 | 10.8 | 8.8 | 19.6 | 4 | −743 | 6 | 216 |
| 6 | 57.3 | 25.6 | 11.6 | 5.4 | 17.0 | 5 | −978 | 8 | 650 |
| 7 | 59.7 | 26.3 | 11.4 | 2.6 | 14.0 | 6 | −1162 | 8 | 1501 |
| 8 | 60.0 | 26.8 | 11.2 | 2.0 | 13.2 | 6 | −1221 | 8 | 1267 |
| 9 | 60.6 | 27.3 | 10.7 | 1.3 | 12.0 | 6 | −1280 | 8 | 1034 |
| 10 | 59.8 | 27.2 | 12.2 | 0.9 | 13.1 | 6 | −1255 | 8 | 212 |

TABLE 2

| Sample No. | Cr | x Al | y N | z O | y + z N + O | Resistivity ρ (Ω · μm) | TCR ppm | k-factor | TCS ppm |
|---|---|---|---|---|---|---|---|---|---|
| | Strain Resistance Film Composition (at %) | | | | | | | | |
| 11 | 84.3 | 14.0 | 1.1 | 0.7 | 1.8 | 3 | −587 | 9 | −52 |
| 12 | 80.9 | 13.4 | 5.3 | 0.4 | 5.6 | 3 | −293 | 8 | 140 |
| 13 | 76.6 | 12.7 | 10.2 | 0.5 | 10.7 | 3 | −861 | 9 | 493 |
| 14 | 53.0 | 26.5 | 20.0 | 0.5 | 20.5 | 4 | −593 | 6 | −616 |
| 15 | 51.6 | 25.8 | 22.0 | 0.5 | 22.5 | 3 | −26 | 4 | −3096 |

TABLE 3

| Sample No. | Cr | x Al | y N | z O | y + z N + O | Resistivity ρ (Ω · μm) | TCR ppm | k-factor | TCS ppm |
|---|---|---|---|---|---|---|---|---|---|
| | Strain Resistance Film Composition (at %) | | | | | | | | |
| 21 | 60.0 | 26.7 | 8.7 | 4.7 | 13.3 | 6 | −749 | 5 | 262 |
| 22 | 59.0 | 26.6 | 7.3 | 7.0 | 14.3 | 6 | −578 | 4 | 900 |
| 23 | 59.8 | 26.6 | 4.1 | 9.4 | 13.5 | 5 | −411 | 4 | 579 |

10: Pressure Sensor
12: Connecting Member
**12*a***: Thread groove
**12*b***: Flow path
14: Suppressing member
16: Circuit board
20: Stem
21: Flange
22: Membrane
**22*a***: Inner surface
**22*b***: Outer surface
32, 132: Strain resistance film
34: Electrical wiring
36: Electrode
52: Base insulating layer
72: Intermediate wiring
122: Si substrate
152: $SiO_2$ film
R1: First resistor
R2: Second resistor
R3: Third resistor
R4: Fourth resistor

What is claimed is:

1. A strain resistance film comprising a composition represented by $Cr_{100-x-y-z}Al_xN_yO_z$, satisfying 5≤x≤50, 0.1≤y≤20, 0.1≤z≤17, and y+z≤25.

2. The strain resistance film according to claim 1, having a film thickness of 10 nm or more.

3. A physical quantity sensor comprising the strain resistance film according to claim 1.

4. A manufacturing method of the strain resistance film according to claim 1, the manufacturing method being a thin film method, wherein during the thin film method, k-factor and temperature coefficient of resistance of the strain resistance film are controlled by controlling an oxygen amount and a nitrogen amount in an atmosphere gas.

5. The strain resistance film according to claim 1, wherein y+z is 12.0 to 20.0.

6. The strain resistance film according to claim 1, wherein y+z is 14.0 to 20.0.

7. The strain resistance film according to claim 1, wherein y+z is 1.8 to 10.7.

* * * * *